(12) United States Patent
Keskes et al.

(10) Patent No.: US 10,746,889 B2
(45) Date of Patent: Aug. 18, 2020

(54) METHOD FOR ESTIMATING FAULTS IN A THREE-DIMENSIONAL SEISMIC IMAGE BLOCK

(71) Applicant: TOTAL SA, Courbevoie (FR)

(72) Inventors: Noomane Keskes, Pau (FR); Georges Sibille, Lons (FR)

(73) Assignee: TOTAL SA, Courbevoie (FR)

( * ) Notice: Subject to any disclaimer, the term of this patent is extended or adjusted under 35 U.S.C. 154(b) by 209 days.

(21) Appl. No.: 15/578,402

(22) PCT Filed: Jun. 1, 2015

(86) PCT No.: PCT/IB2015/001056
§ 371 (c)(1),
(2) Date: Nov. 30, 2017

(87) PCT Pub. No.: WO2016/193772
PCT Pub. Date: Dec. 8, 2016

(65) Prior Publication Data
US 2018/0217282 A1 Aug. 2, 2018

(51) Int. Cl.
*G01V 1/30* (2006.01)
*G01V 1/34* (2006.01)
*G01V 99/00* (2009.01)

(52) U.S. Cl.
CPC ............... *G01V 1/302* (2013.01); *G01V 1/345* (2013.01); *G01V 99/005* (2013.01); *G01V 2210/642* (2013.01)

(58) Field of Classification Search
CPC ............. G01V 1/302; G01V 2210/642; G01V 99/005; G01V 1/345
See application file for complete search history.

(56) References Cited

U.S. PATENT DOCUMENTS

| 2002/0198692 A1 | 12/2002 | Mallet et al. |
| 2013/0345985 A1* | 12/2013 | Priezzhev ................ G01V 1/32 |
| | | 702/14 |
| 2014/0222403 A1 | 8/2014 | Lepage et al. |

FOREIGN PATENT DOCUMENTS

| EP | 2 778 724 A2 | 9/2014 |
| WO | WO 2014/083402 A | 6/2014 |

OTHER PUBLICATIONS

David Gibson et al., Fault Surface Detection in 3-D Seismic Data, Sep. 2005, IEEE Transactions on Geoscience and Remote Sensing, vol. 43, No. 9, pp. 2094-2102 (Year: 2005).*
PCT International Search Report and Written Opinion for PCT/IB2015/001056, dated Feb. 19, 2016, 14 pages.

(Continued)

*Primary Examiner* — Mischita L Henson
(74) *Attorney, Agent, or Firm* — Patterson Thuente Pedersen, P.A.

(57) ABSTRACT

The invention pertains to a method for estimating faults in a three-dimensional seismic image block. Directrices are generated within respective first cross-sections of the seismic image block based on points selected by a user. Similarly, generatrices are generated within respective second cross-sections of the block based on points selected by the user. The user inputs relationships between directrices and generatrices. A fault is estimated within the seismic image block as a surface including at least one directric and at least one generatrix having a relationship therebetween.

14 Claims, 7 Drawing Sheets

(56) References Cited

OTHER PUBLICATIONS

Massala, A. et al: "An Innovative Attribute for Enhancing Faults Lineaments and Sedimentary Features During 2G&R Interpretation", SPE Annual Technical Conference and Exhibition, 2013, Sep. 30, 2013 (Sep. 30, 2013), pp. 1-20, XP002753979, DOI: 10.2118/166122-MS retrieved from the Internet: URL:http://dx.doi.org/10.2118/166122-MS [retrieved on Feb. 1, 2016].

* cited by examiner

METHOD FOR ESTIMATING FAULTS IN A THREE-DIMENSIONAL SEISMIC IMAGE BLOCK

RELATED APPLICATIONS

The present application is a National Phase entry of PCT Application No. PCT/IB2015/001056, filed Jun. 1, 2015, said application being hereby incorporated by reference herein in its entirety.

FIELD OF THE INVENTION

The invention pertains to the field of identifying geological features from seismic data in a time or depth representation. More specifically, the invention provides a method for estimating a seismic fault in a three-dimensional seismic image block representing a subsurface region.

BACKGROUND OF THE INVENTION

Seismic surveys seek to acquire seismic data that can be used to extract information on the geological features of the subsurface region under investigation. Generally, seismic data provides raw information on geological features that then needs to be processed in order to build a model representing the subsurface region with accuracy.

Special features of the subsurface region can be identified directly on raw seismic data. Such raw seismic data can be browsed through by an operator for example in a 3D representation called seismic cube or seismic image block. Such representations of the seismic data can represent information as a function of time or as a function of depth.

Among the special geological features that can be identified on three-dimensional representations of a subsurface region, geological faults are remarkable insofar as they form interfaces at which strong discontinuities in seismic data lead to an increased complexity of the inverse problem. It is much recommended to identify and characterize these faults prior to any mathematical modeling based on seismic data.

Identifying, locating and mapping faults (i.e. "estimating" faults) from seismic data is not an easy task. Indeed, faults come in different shapes and generally form a whole network of discontinuities in a subsurface region. Faults are not necessarily perpendicular to seismic horizons, and can form a complex network in which several faults intersect.

One prior art method for estimating faults in a three-dimensional seismic image block representation of a subsurface region consists in manually selecting points belonging to a seismic fault in the representation. A manual picking is time consuming because it requires a considerable amount of points to get an accurate and complete two-dimensional estimation of a seismic fault. The required number of points is high even in the case of seismic faults having a substantially planar shape.

Locations of a seismic image block assumed to correspond to faults can also be fitted with a network of planes based on the maximum values of fault attributes in seismic data according to a method called "fault peeling". This method works well in the case of simple planar-shaped seismic faults. However, more complex shapes require a lot of calculation steps and approximations to generate the network of planes and such a method produces triangulated surfaces that still require further processing to be smoothed.

Another method to estimate seismic faults in a three-dimensional seismic image block representation of a subsurface region consists in animating the three-dimensional representation of the seismic data to help a user visualize the position of seismic faults. This method called "fault tracking" provides an improved manual picking of points on the seismic fault but still requires a lot of manual input and a considerable amount of points to generate a full surface characterization of a seismic fault.

Therefore, a method that requires fewer inputs from an operator to fully characterize a seismic fault and that can provide an accurate picture of a seismic fault is sought.

SUMMARY OF THE INVENTION

To overcome the above-mentioned drawbacks, the invention provides a method for estimating faults in a three-dimensional seismic image block representing a subsurface region, the method comprising:

generating directrices, wherein each directrix is within a respective first cross-section of the seismic image block and generated based on points graphically selected by a user on the respective first cross-section;

generating generatrices, wherein each generatrix is within a respective second cross-section of the seismic image block and generated based on points graphically selected by the user on the respective second cross-section;

obtaining relationships from the user, wherein each relationship is between a directrix and a generatrix;

estimating a fault within the seismic image block as a surface including at least one directrix and at least one generatrix having a relationship therebetween.

The method of the invention requires a minimal amount of points to generate a full estimation of a seismic fault. Indeed, simple shapes can be accurately estimated using one directrix generated from at least two points selected on a first cross-section of the seismic image block and one generatrix also generated from at least two points selected on a second cross-section of the seismic image block. Naturally, more than two points can be used to more accurately account for the specific shape of a seismic fault if deemed necessary. More than one generatrix and more than one directrix are generally used to obtain a more accurate estimation of a seismic fault in the seismic image block.

As compared to prior art methods for estimating seismic faults, the method of the invention enables a significantly faster estimation of seismic faults, even in the case of complex geological features. A comparison between manual picking of points on a seismic image block over a whole two-dimensional surface and the method of the invention relying on directrices and generatrices shows that the method of the invention is about twenty times faster than prior art fault characterization methods.

It is to be noted that the concept of "first cross-section" and "second cross-section" is to be understood as referring to any shape within a three-dimensional space, but that these surfaces does not necessarily need to appear in the form of a plane or specifically outlined surface within that three-dimensional space.

For example, it is possible for a user to navigate through a seismic cube in three dimensions and select points in the cube along what he assumes to be a "first cross-section", although no such surface stands out from the rest of the three-dimensional volume of the cube. The "first cross-section" and "second cross-section" are then virtual objects. Alternatively, the "first cross-section" and the "second cross-section" may be in the form of two-dimensional slices of the seismic image block.

According to an embodiment, the method may further comprise:

building a graph having nodes and arcs, wherein the generated directrices and generatrices are each represented by a respective node of the graph and each arc of the graph represents a respective relationship obtained between a directrix and a generatrix; and identifying a fault based on a connected set of nodes of the graph, wherein the fault is estimated, within the seismic image block, as a surface including each directrix and each generatrix represented by nodes of the connected set.

A graph representation used in the method of the invention offers a simple visual representation of the degree of complexity of the subsurface region. Indeed, a graph representation enables an easy identification of isolated faults, appearing as a connected set of nodes. More complex relationships in the structure of the faults, such as for example intersections between faults forming a network of intertwined faults can be identified on a graph representation with special directrices of generatrices at the intersection of two connected sets of nodes.

Furthermore, a graph representation is not prone to any modifications in the event that a user decides to update the generated generatrices and/or directrices by adding more points, removing points or modifying the position of existing selected points.

According to an embodiment, the method further comprises:

defining a navigation line in a first cross-section based on a user input; and selecting second cross-sections, for generating generatrices, as extending transversely to the navigation line.

Second cross-sections, especially when they are slices of the seismic image block, can advantageously be set as being perpendicular to specific lines called "navigation lines" defined in the three-dimensional representation of the subsurface region. The presence of "navigation lines" enables an easier viewing of the seismic image block. It may for example be used to "navigate" through the block to change the perspective or to select an appropriate cross-section for a better view of seismic faults. Navigation may be a line or set of lines running through the seismic image block. It may in particular appear in the form of a surface.

According to an embodiment, the method further comprises, in the process of generating directrices:

displaying points selected by the user using a first type of recognizable graphical parameters, and, changing the first type of recognizable graphical parameters used to display selected points when the user switches from one seismic fault on a respective first cross-section to another seismic fault, or from a respective first cross-section to a respective second cross-section.

The method may further comprise, in the process of generating generatrices:

displaying points selected by the user using a first type of recognizable graphical parameters, and, changing the first type of recognizable graphical parameters used to display selected points when the user switches from one seismic fault on a respective second cross-section to another seismic fault, or from a respective second cross-section to a respective first cross-section.

By using a same first type of recognizable graphical parameters to represents points selected by a user, a generatrix or directrix can be easily identified in the cross-sections and in the seismic image block. The term "first type of recognizable graphical parameters" can for example refer to a type of symbol such as a round or circle. By changing the first type of recognizable graphical parameters upon moving to a different fault or upon moving to a different cross-section, the method enables a representation in which each directrix and each generatrix can be easily identified. For example, one directrix may be made up of points appearing as red circles whereas another directrix may appear as being made up of yellow circles. Each directrix and generatrix can for example be identified by its colour, and points selected by the user can be represented by a specific shape or symbol.

According to an embodiment, the method further comprises:

displaying a point of intersection between a directrix and a respective second cross-section or between a generatrix and a respective first cross-section using a second type of recognizable graphical parameters.

By using a second type of recognizable graphical parameters points of intersection between a directrix and a respective second cross-section can be discriminated from selected points. This enables an easier identification of these points of intersection in order to build relationships between a directrix and a generatrix. The second type of recognizable graphical parameters may for example be triangles, having the same colour as the colour of the corresponding directrix or generatrix.

According to an embodiment, the method further comprises:

enabling the user to select a point of intersection between a directrix and a respective second cross-section or between a generatrix and a respective first cross-section in order to obtain a relationship between a directrix and a generatrix; and displaying a selected point of intersection using a third type of recognizable graphical parameters.

The method of the invention may advantageously make the points of intersection mentioned above selectable, so that the user may easily define relationships between a generatrix and a directrix. Assuming these points of intersection appear as selectable triangles, when the user defines a relationship between a directrix and a generatrix, the triangle may for example transform into a square, having the same colour as either the directrix or generatrix.

Advantageously, the first, second and third recognizable graphical parameters may be different from one another.

That way, the user can easily see which features correspond to selected points, to selectable intersection points or to established connections between a directrix and a generatrix.

Advantageously, the first, second and third recognizable graphical parameters are chosen among a colour, a shape, a symbol, or a label.

According to an embodiment, the method further comprises:

generating a generatrix or directrix based on points selected at an intersection between geological features belonging to two seismic faults in the seismic image block.

The intersection between two seismic faults is a particularly remarkable feature of a subsurface region. When points of such an intersection are selected to generate a generatrix or a directrix, the structure of the network of seismic faults and in particular, the intersections between faults can be more easily identified on a graph representation.

According to an embodiment, selecting points is done with one click on a first button and switching a selection of points from a respective first cross-section to a respective second cross-section or from a respective second cross-section to a respective first cross-section is done with a click on a second button.

Such an embodiment is particularly efficient in the context of a human-machine interface in which a user selects points for example with a mouse on a computer.

According to an embodiment, a respective first cross-section is oriented along a seismic horizon, thus forming a horizontal section of the three-dimensional seismic image block.

A cross-section that matches a geological feature of the subsurface region is a particularly relevant choice for a first cross-section. A fault typically appears as a point of disruption of a seismic horizon. Using seismic horizons to define first cross-sections therefore contributes to a better viewing of faults.

The invention also pertains to a computer program product comprising instructions to carry out a method for estimating faults in a three-dimensional seismic image block representing a subsurface region, the method comprising:

generating directrices, wherein each directrix is within a respective first cross-section of the seismic image block and generated based on points graphically selected by a user on the respective first cross-section;

generating generatrices, wherein each generatrix is within a respective second cross-section of the seismic image block and generated based on points graphically selected by the user on the respective second cross-section;

obtaining relationships from the user, wherein each relationship is between a directrix and a generatrix;

estimating a fault within the seismic image block as a surface including at least one directrix and at least one generatrix having a relationship therebetween.

BRIEF DESCRIPTION OF THE DRAWINGS

The method of the invention will be better understood by reading the detailed description of exemplary embodiments presented below. These embodiments are illustrative and by no means limitative. They are provided with the appended drawings in which.

For the sake of clarity, the dimensions of features represented on these figures may not necessarily correspond to the real-size proportions of the corresponding elements. Like reference numerals on the figures correspond to similar elements or items.

DETAILED DESCRIPTION OF THE DRAWINGS

The invention provides a method for rapidly estimating a seismic fault or a network of seismic faults based on seismic data that is generally represented in the form of a three-dimensional seismic image block.

Figure 1:
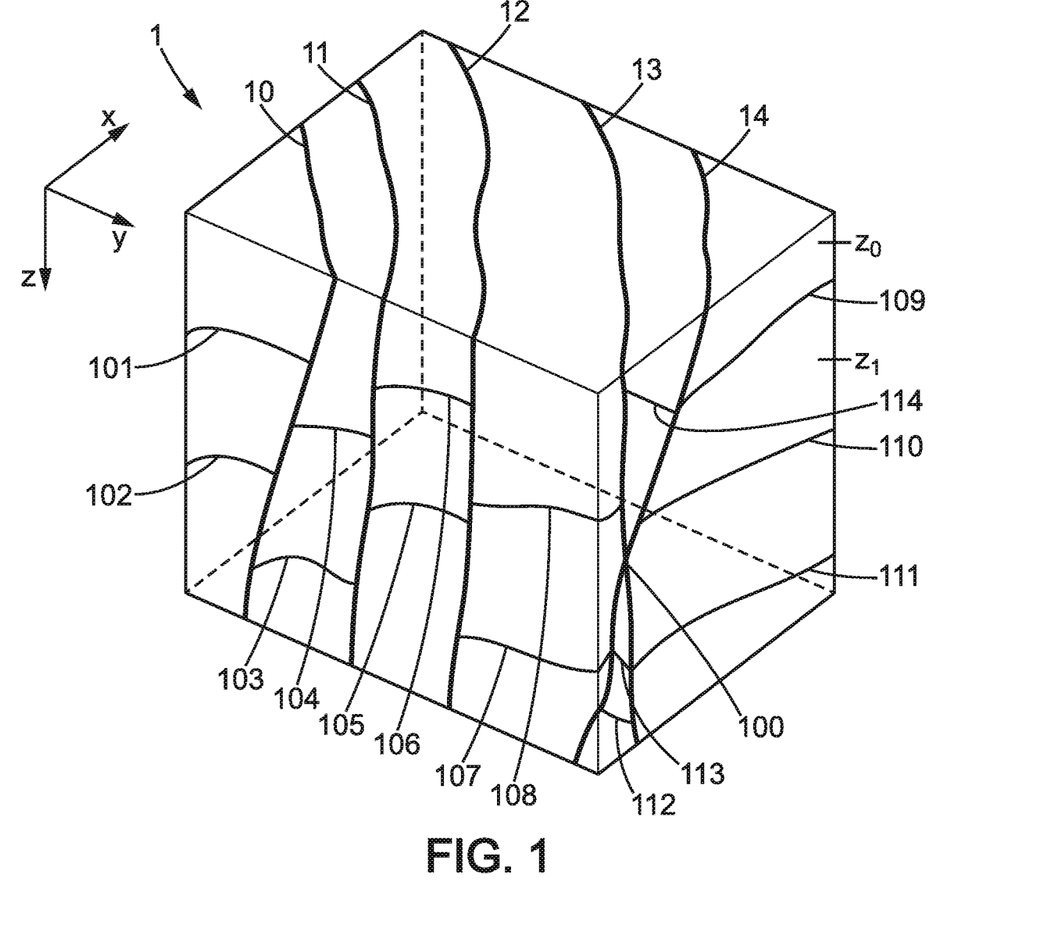
FIG. 1 is a schematic representation of a three-dimensional seismic image block displaying several seismic faults.

As illustrated on FIG. 1, a seismic image can be a three-dimensional cube, also called seismic cube or seismic image block 1. Depending on the geology of the subsurface region under investigation, features represented on the seismic image block 1 may comprise several faults 10-14. The representation of FIG. 1 provides a simplified view of a seismic image block 1, comprising several discontinuous horizons 101-114 intersected by seismic faults 10-14. Some seismic faults may themselves intersect one another, thereby forming even more discontinuous and complex geological features, as illustrated by intersection 100 between seismic faults 13 and 14. Seismic image block 1 is represented in three dimensions in a coordinate system defined by axes x, y, z and levels represented along axis z. Levels z0 and z1 are referred to hereafter. Levels z0 and z1 can advantageously be chosen as corresponding to the level of a seismic horizon, i.e. an interface between two geological layers, in order to facilitate the visual identification of faults on the cross-sections defined using these levels.

The complexity of the shapes of seismic faults 10-14 requires an accurate estimation that is rendered simple and intuitive with the method of the invention. FIGS. 2 to 9 provide an illustration representing an example of how the method of the invention may be implemented on seismic image block 1.

Figure 2:
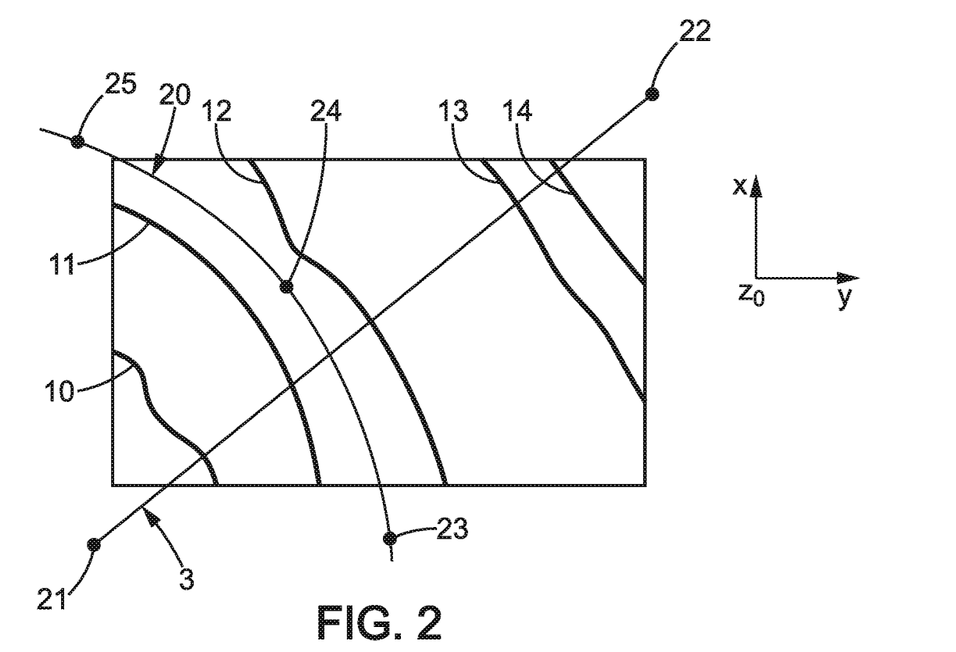
FIG. 2 is a schematic representation of a first cross-section at a level z0 of the seismic image block of FIG. 1 along with two navigations.

FIG. 2 illustrates a planar cross-section of seismic image block 1 at level z0, seen from above. This cross-section is substantially parallel to the seismic horizons 101-114. Although in this example, the cross-section of FIG. 2 is horizontal and planar, it may as well be a wavy surface, in particular a surface that better matches the general shape of seismic horizons in the subsurface region under investigation. The cross-section of FIG. 2 can be referred to as a "first cross-section".

A general trend in the shape of seismic faults 10-14 can be seen on FIG. 2: seismic faults seem to be somewhat concentric. To account for such trends in the shapes of seismic faults 10-14, and to simplify the building of a graph, the method may advantageously define special surfaces, or sets of lines called "navigation".

Navigation 3 is a straight line obtained by selecting two points on the cross-section of FIG. 2 and fitting them with a line. Navigation 3 appears to be along a direction perpendicular to seismic faults 10-14. In that respect, any planar cross-section of seismic image block 1 perpendicular to navigation 3 is likely to provide a visual insight into the profile of seismic faults 10-14 along axes x and y as a function of level z.

Points 23-25 are selected so that the curve fitting these points defines a navigation 22 that appears to be oriented along the general "concentric" shape of seismic faults 10-14 as seen on the cross-section of FIG. 2. As a result, any planar cross-section of seismic image block 1 perpendicular to navigation 22 is likely to display a significant number of seismic faults, thereby enabling an easier characterization of these seismic faults.

Cross-sections perpendicular to navigation 22 enable a better representation of seismic faults as seen on FIG. 2. In the example provided below, only cross-sections perpendicular to navigation 22 are represented and used.

Figure 3:
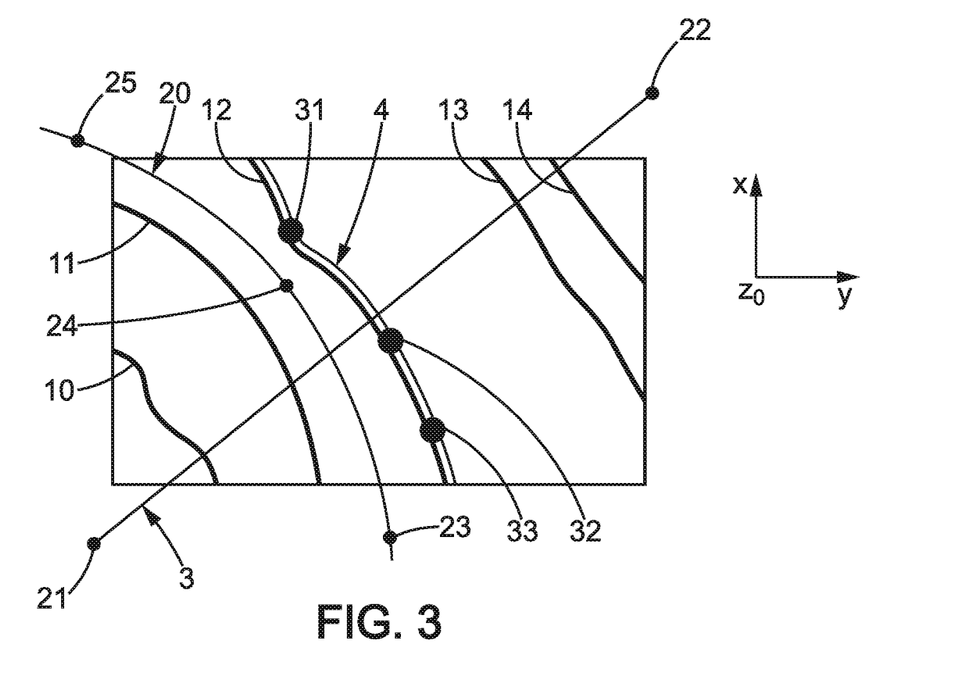
FIG. 3 is a schematic representation of the first cross-section of FIG. 2 showing points selected by a user and which can be used to generate a directrix.

FIG. 3 provides a further representation of the cross-section of FIG. 2. Points 30-33 were selected on seismic fault 12 by a user using a man-machine interface such as for example, a computer. These points 30-33 can be fitted by a curve 4, using any known fitting method such a regression or spline. Naturally, the accuracy of the characterization of seismic fault 12 on the cross-section of FIG. 3 increases as the number of selected points 30-33 increases.

The selection of points 30-33 can advantageously be done using a simple click by the user. For example, in the case of a man-machine interface in the form of a computer, a user may start selecting points by a left-click on a mouse.

As represented on FIG. 3, each point selected on fault 12 appears as a full circle. Any other type of representation could be used. The representation used to display the selected points is called "first type of recognizable graphical parameters" and can for example be chosen as any type of colour, shape, symbol or label.

Once the user is done selecting points on a seismic fault of the cross-section of FIG. 3, he may switch to a different seismic fault on the cross-section of FIG. 3. This operation may be triggered for example using a right-click on a mouse. Another left-click then triggers a new selection of points which may appear, for example, on a screen in a different colour or shape or label or format than those of points 30-33. By changing the first type of recognizable graphical representation used to represent the new set of points on another fault, the user can easily see which fault he is mapping in the cross-section.

A curve fitting points 30-33 enables the user to see whether the number of points 30-33 that were selected is consistent with an accurate mapping of seismic fault 12. In case of an unfortunate selection of a point, the man-machine interface enables the removal of a point. This removal is followed by the recalculation of the curve. Alternatively, more points can be added to increase the accuracy of the characterization if deemed necessary.

The above-mentioned curve, is obtained using points 30-33 and their coordinates. Such a curve is called a "directrix" 4, that will later be used with a complementary object called a "generatrix" as described hereafter. A directrix is a curve "mapping" a seismic fault on a cross-sectional portion of the seismic image block 1.

Alternatively, the user may trigger a change of representation, for example with a double-click on a right button of a mouse or any other similar and simple operation. Such an operation may for example lead back to the seismic image block representation of FIG. 1. The user may then select a navigation, for example navigation 22, with a left-click as well as a position on the navigation. The selection of a position on the navigation may be done using a click on the left button of a mouse. Selecting a position on the navigation may switch the representation from that of FIG. 1 to that of FIG. 4. The representation of FIG. 4 corresponds to a cross-section of seismic image block 1 in a plane 5 perpendicular to the selected position on navigation 22.

Figure 4:
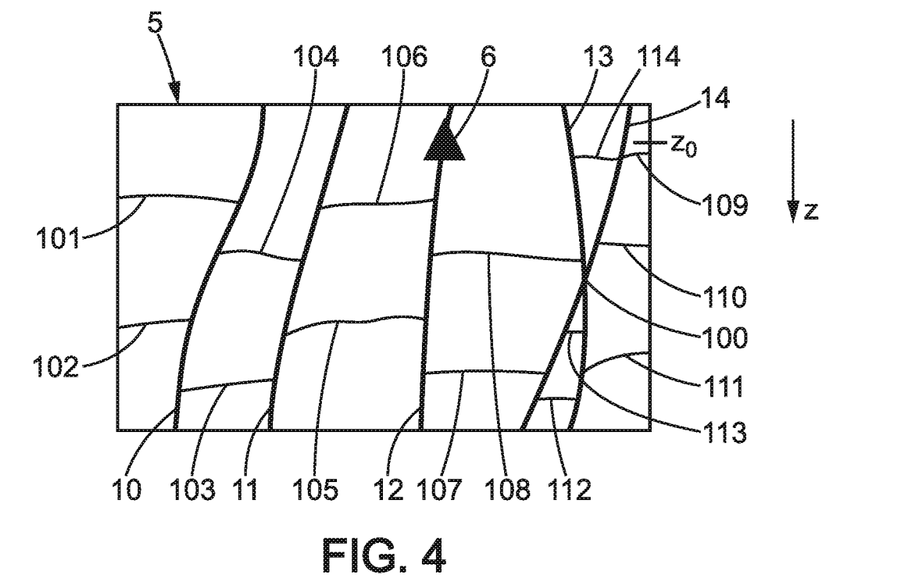
FIG. 4 is a schematic representation of a second cross-section of the seismic image block of FIG. 1 showing the intersection with the second cross-section of a spline fitting through the points selected on FIG. 3.

It is also possible to implement a direct switching from the first cross-section of FIG. 3 to the second cross-section of FIG. 4. For example, a double click on the right button of a mouse may trigger such a change from a horizontal cross-section to a vertical cross-section.

It is to be noted that in the example presented here, plane 5 and the first cross-section are perpendicular. In other embodiments this may not be the case. Plane 5 corresponds to a "second cross-section", and is, in the particular example presented here, oriented perpendicularly to the seismic horizons of the seismic image block 1. Plane 5 corresponds to a vertical section of the three-dimensional seismic image block 1.

Seismic horizons 101-114 as well as seismic faults 10-14 are seen in plane 5 on FIG. 4. A triangle indicates the position at which directrix 4 from FIG. 3 intersects plane 5. Point 6 at level z0 is therefore a possible candidate to select a point on seismic fault 12 in the cross-sectional plane 5 of FIG. 4. The triangle representation corresponds to a "second type of recognizable graphical parameters".

Figure 5:
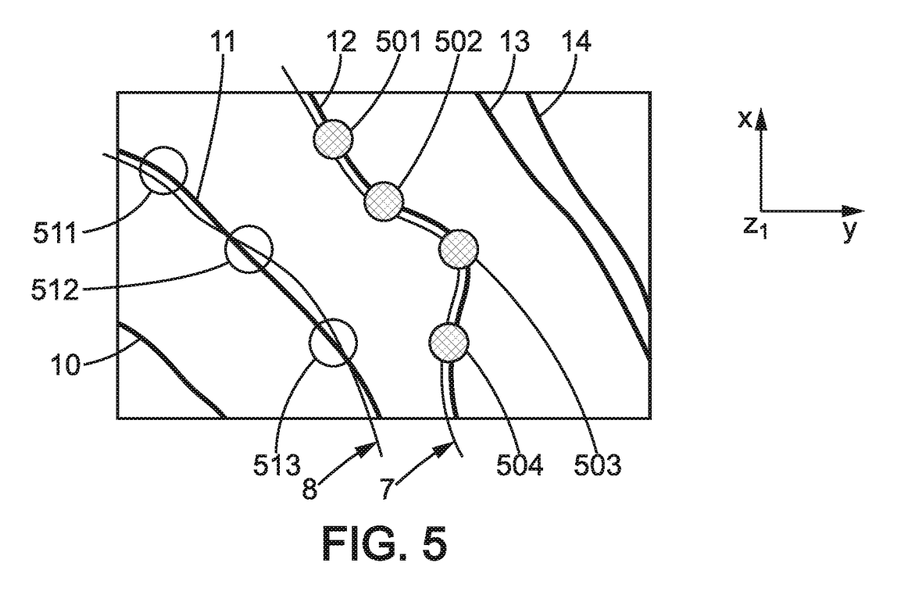
FIG. 5 is a schematic representation of a first cross-section at a level z1 of the seismic image block of FIG. 1 showing points selected by a user and which can be used to generate a second directrix.

To get a more accurate characterization of seismic faults, it is advantageous to select points at different levels z in the seismic image block 1. FIG. 5 is a cross-section of seismic image block 1 at level z1. As represented on FIG. 5, two series of points were selected by a user. A first series of points 501-504 was selected on seismic fault 12 and a second series of points 511-513 was selected on seismic fault 11. Directrices 7 and 8 fitting these two series of points are also represented. As can be seen on FIG. 5, points 501-504 and 511-513 are represented in a format that differs from that of points 30-33. By switching from one fault to another fault, the user triggered a change in the 'first type of recognizable graphical parameters" used to represent selected points 501-504 and 511-513. This change enables a better visual identification of the different directrices that were generated.

The selection of points 501-504 and 511-513 can advantageously be implemented in a very simple way, as explained above. In particular, it is to be noted that the method of the invention allows a selection of points that does not require browsing through complex menus to switch between a point selection mode, a browsing mode or a fault selection mode.

Figure 6:
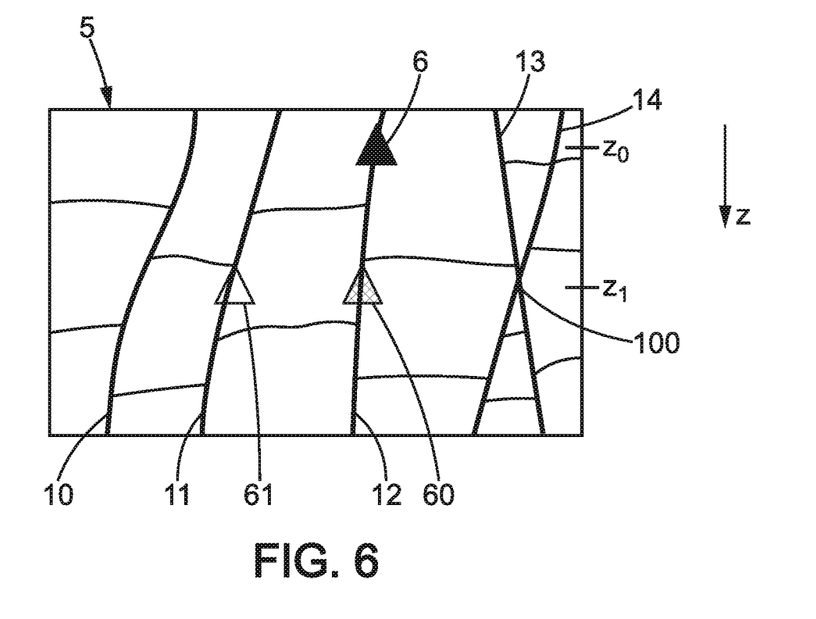
FIG. 6 is a schematic representation of the second cross-section of FIG. 4 showing all the intersections with the second cross-section of splines from the cross-sections of FIGS. 3 and 5.

FIG. 6 represents plane 5 with point 6 as well as points 60, 61 corresponding respectively to the intersections of directrices 7 and 8 with plane 5. Since points 6, 60, 61 are all associated with different directrices, they appear as triangles having different colours or shapes or label or format. In the example of FIG. 6, the filling of triangles 6, 60, 61 is the same as those of the filling of the circles used to represent points 30-33, points 501-504 and 511-513.

Figure 7:
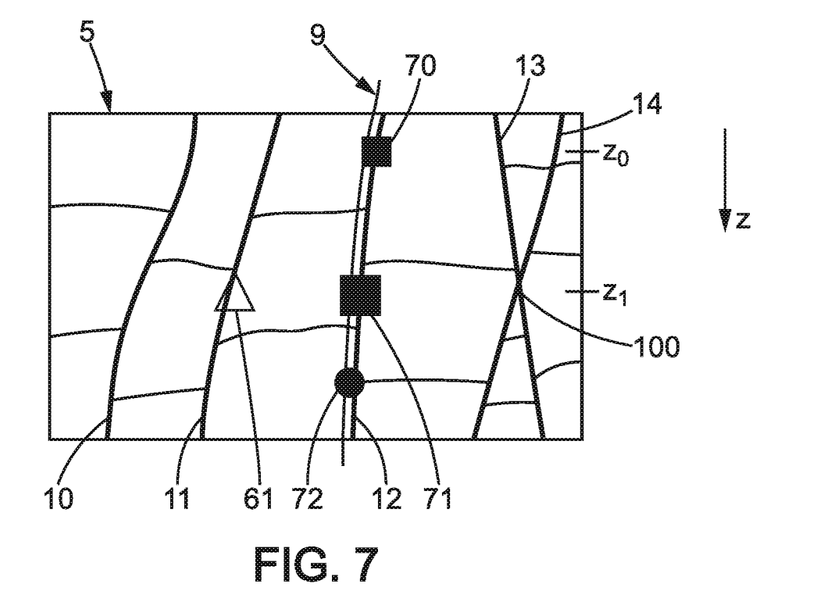
FIG. 7 is a schematic representation of the second cross-section of FIG. 6, further comprising points selected by a user and which can be used to generate a generatrix.

FIG. 7 is a further representation of plane 5 wherein the user selected more points on seismic fault 12. In particular, the user selected point 72 in the second cross-section, and a generatrix 9 passing through points 6, 60 and 72 was generated. In addition to generating generatrix 9, the user also defined a relationship binding directrix 4 and directrix 7 with generatrix 9. This is illustrated on FIG. 7 by triangles 6, 60 reappearing in the form of squares 70, 71. By clicking on points 6 and 60 from FIG. 6, the triangles of FIG. 6 were transformed into squares as seen on FIG. 7.

Having defined several directrices (i.e. directrix 4 generated using points 30-33 and directrix 7 generated using points 501-504), and a generatrix 9 on seismic fault 12, it is possible to bind a directrix with a generatrix. The process described above can be repeated as often as deemed necessary to accurately account for the specificities of seismic fault 12.

Having directrices and generatrices, a model of the seismic fault 12, or estimation of the seismic fault 12 can be obtained in the form of a surface including each directrix and each generatrix. Another representation that may be visually more synthetic and easier to interpret is a graph representation of the identified faults.

Figure 8:
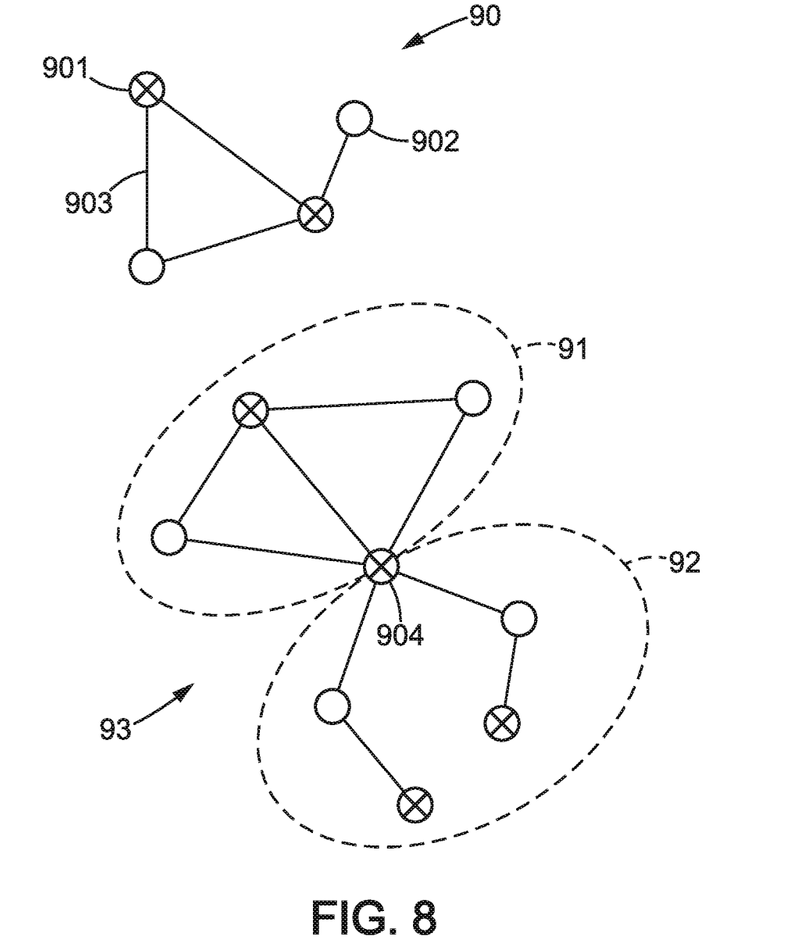
FIG. 8 is a schematic representation of a graph obtained using the method of the invention.

FIG. 8 provides a schematic illustration of a graph obtained by defining a set of directrices and generatrices on a network of seismic faults.

In the context of this invention, each generatrix and each directrix forms a node 901, 902 of the graph. The relationships between a directrix and a generatrix (that is, the squares resulting from a selection of a triangle by the user as represented on FIG. 7) form arcs 903 of the graph. Seismic fault 12 is identified in the graph representation as a connected set 90 of nodes of the graph.

As seen on FIG. 8, it is possible to choose graphical representations enabling a discrimination between generatrices (represented with the symbol used at node 901) and directrices (represented with the symbol used at node 902). A single fault that does not intersect any other fault can be identified on the graph as an isolated connected set of nodes such as connect set 90 of FIG. 8. Sometimes, faults intersect which may lead to a more complex connected set of nodes such as connected set 93. Connected set 93 comprises one node 904 that corresponds to a remarkable generatrix. Node 904 is associated with a generatrix generated from points located on the intersection between two faults; namely that seen as binding subset 91 of connected set 93 with subset 92.

Naturally, although not illustrated on FIG. 8, the intersection between two faults may also be associated with a remarkable directrix generated from points located on that intersection. The intersection between two faults may be either a directrix or a generatrix depending on whether the intersection of two faults is substantially along a vertical cross-section or a horizontal cross-section.

A seismic fault can in theory be estimated using only one directrix and one generatrix, and a relationship between the two. Each generatrix and each directrix requires a selection of at least two points.

The first and second cross-sections in the example described above are planes, but can in theory be surfaces having non-planar shapes. Non-planar shapes can in particular be more convenient surfaces in subsurface regions comprising ondulated and identifiable geological features.

One advantage of the method of the invention is that it requires a minimal number of points to estimate a seismic fault. Furthermore, the easiness with which points can be selected, without the need to browse through complex menus, enables a faster implementation than prior art methods. In particular, it has been noticed that the method of the invention is about twenty times faster than other methods requiring a manual selection of points on geological features of a three-dimensional seismic image block.

As mentioned before, it is still possible to make corrections in order to improve the accuracy of the estimated seismic fault. In that respect, the method of the invention offers a high degree of flexibility. If a point is deemed to have been incorrectly selected as belonging to a seismic fault, it is possible to remove that point from the generatrix or directrix. Likewise, points can be added to a generatrix or directrix at any time. Any other structural modifications of selected points can be done at any time by the user if deemed necessary.

It is to be noted that a graph representation is not affected by such modifications. A graph representation, such as that of FIG. 8, displays relationships between generatrices and directrices, thereby providing an insight into the general structure of the faults of the subsurface region under investigation.

The example discussed above focuses on the estimation of one seismic fault. In reality, geological features may be a lot more complex and form a network of intertwined faults in the subsurface region.

Figure 9:
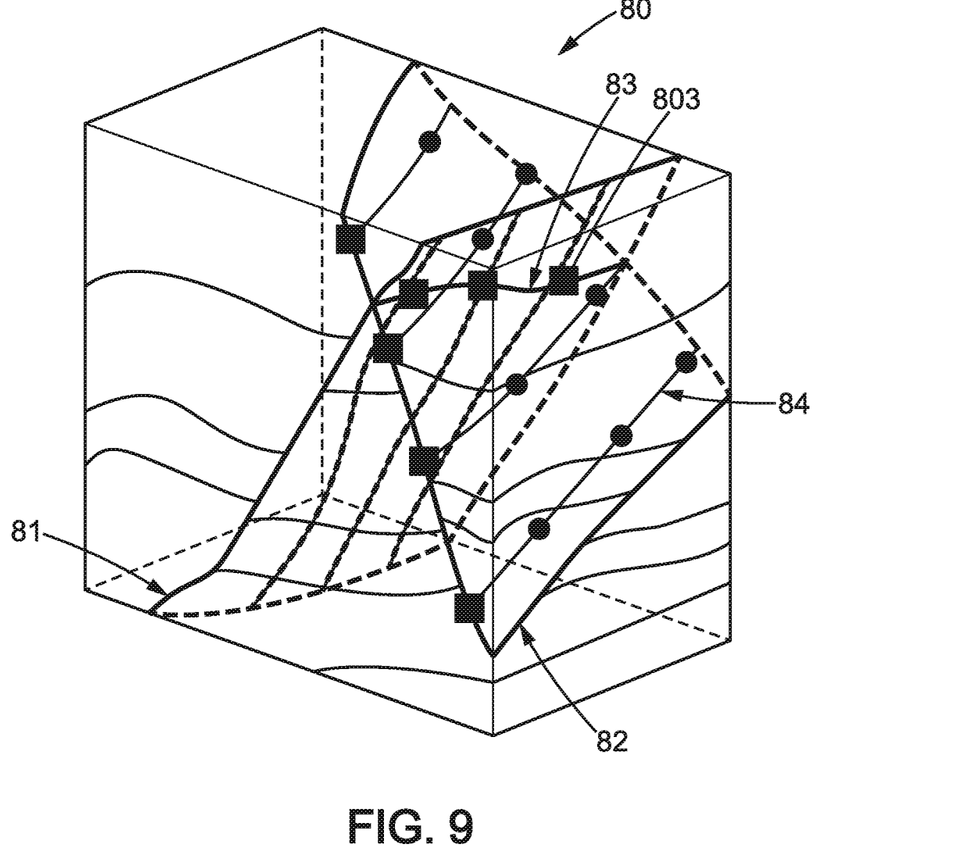
FIG. 9 is a schematic representation of a portion of a three-dimensional seismic image block displaying two intersecting seismic faults.

FIG. 9 illustrates one example of a complex intersection between two faults in a seismic cube 80. To account for this complexity in a simple and intuitive way, the invention can take advantage of special features of the subsurface region. As represented on FIG. 9, the intersection of both seismic faults 82 and 81 forms a remarkable directrix 83 that is made up of points belonging simultaneously to both seismic faults. Point 830 for example belongs to both seismic faults 81 and 82. Each seismic fault 81, 82 comprises its own lot of directrices and generatrices as illustrated by directrix 84 on fault 82.

Special geological features such as intersections between faults are therefore advantageously characterized by selecting points thereon to form a generatrix or a directrix. These special generatrices or directrices enable a more accurate estimation of the complex relationship between faults in a subsurface region in order to represent with a few number of points a whole network of faults. They also provide convenient nodes for a graph representation enabling an easier viewing of the structure of the network of faults in a subsurface region.

The above method can advantageously be implemented by a man-machine interface such as a computer.

Figure 10:
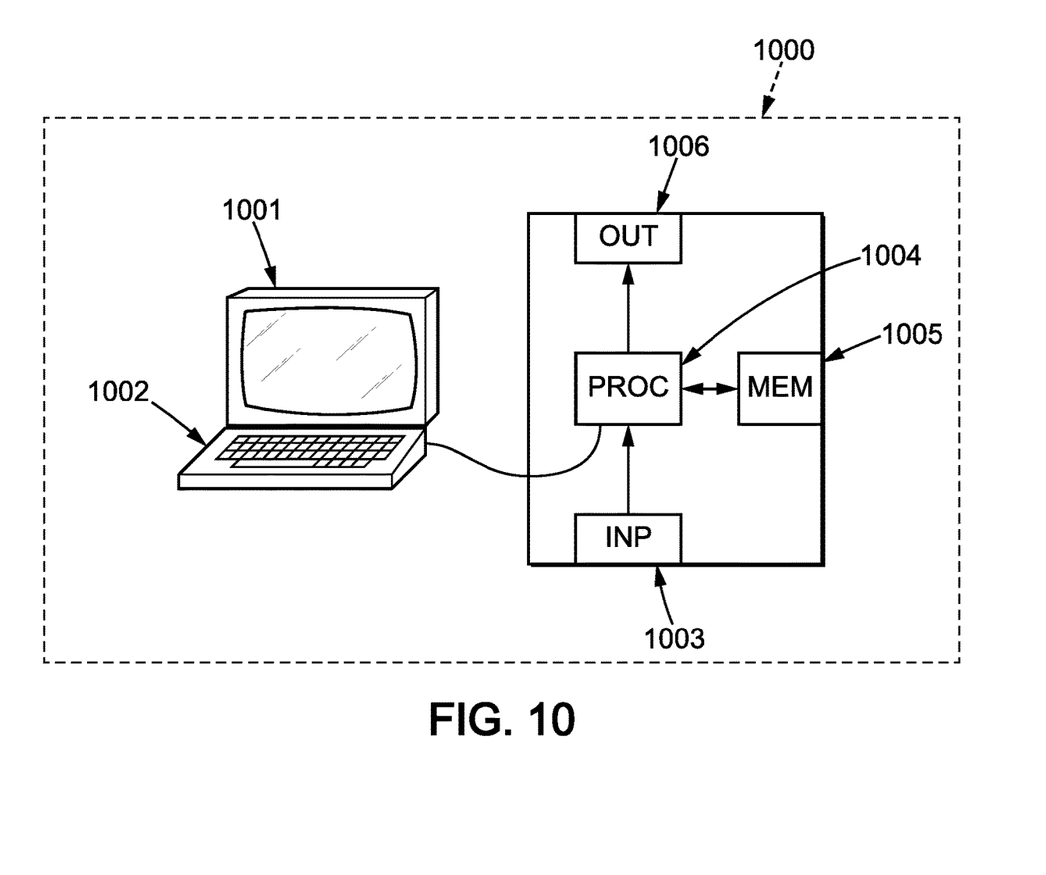
FIG. 10 is a possible embodiment for a device that can be used to implement the method of the invention.

FIG. 10 is a possible embodiment for a device that can be used to implement the above method.

In this embodiment, the device 1000 comprises a computer, this computer comprising a memory 1005 to store program instructions loadable into a circuit and adapted to cause circuit 1004 to carry out the steps of the present invention when the program instructions are run by the circuit 1004.

The memory 1005 may also store data and useful information for carrying the steps of the present invention as described above.

The circuit 1004 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This computer comprises an input interface 1003 for the reception of data used for the above method according to the invention and an output interface 1006 for providing a stacked model.

To ease the interaction with the computer, a screen 1001 and a keyboard 1002 may be provided and connected to the computer circuit 1004.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method, implemented by a computer comprising a human-machine interface, for estimating seismic faults in a three-dimensional seismic image block representing a real subsurface region, the method comprising:
    generating the three-dimensional seismic image block representing the real subsurface region based on seismic data gathered from the real subsurface region;
    generating directrices, wherein each directrix is within a respective first cross-section of the seismic image block and generated based on points graphically selected by a user on the respective first cross-section;
    generating generatrices, wherein each generatrix is within a respective second cross-section of the seismic image block and generated based on points graphically selected by the user on the respective second cross-section;
    obtaining relationships from the user, wherein each relationship is between a directrix and a generatrix;
    estimating a seismic fault within the seismic image block as a surface including at least one directrix and at least one generatrix having a relationship therebetween in the obtained relationship; and
    creating an updated seismic image block identifying the location of the seismic faults.

2. The method of claim 1, further comprising:
    building a graph having nodes and arcs, wherein the generated directrices and generatrices are each represented by a respective node of the graph and each arc of the graph represents a respective relationship obtained between a directrix and a generatrix; and
    identifying a fault based on a connected set of nodes of the graph, wherein the fault is estimated, within the seismic image block, as a surface including each directrix and each generatrix represented by nodes of the connected set.

3. The method of claim 1, further comprising:
    defining a navigation line in a first cross-section based on a user input; and
    selecting second cross-sections, for generating generatrices, as extending transversely to the navigation line.

4. The method of claim 1, further comprising, in the process of generating directrices:
    displaying points selected by the user using a first type of recognizable graphical parameters, and,
    changing the first type of recognizable graphical parameters used to display selected points when the user switches from one seismic fault on a respective first cross-section to another seismic fault, or from a respective first cross-section to a respective second cross-section.

5. The method of claim 1, further comprising, in the process of generating generatrices:
    displaying points selected by the user using a first type of recognizable graphical parameters, and,
    changing the first type of recognizable graphical parameters used to display selected points when the user switches from one seismic fault on a respective second cross-section to another seismic fault, or from a respective second cross-section to a respective first cross-section.

6. The method of claim 1, further comprising:
    displaying a point of intersection between a directrix and a respective second cross-section or between a generatrix and a respective first cross-section using a second type of recognizable graphical parameters.

7. The method of claim 1, further comprising:
    enabling the user to select a point of intersection between a directrix and a respective second cross-section or between a generatrix and a respective first cross-section in order to obtain a relationship between a directrix and a generatrix; and
    displaying a selected point of intersection using a third type of recognizable graphical parameters.

8. The method of claim 7, wherein the first, second and third recognizable graphical parameters are different from one another.

9. The method of claim 8, wherein the first, second and third recognizable graphical parameters are chosen among a colour, a shape, a symbol, or a label.

10. The method of claim 1, further comprising:
    generating a generatrix based on points selected at an intersection between geological features belonging to two seismic faults in the seismic image block.

11. The method of claim 1, further comprising:
    generating a directrix based on points selected at an intersection between geological features belonging to two seismic faults in the seismic image block.

12. The method of claim 1, wherein selecting points is done with one click on a first button and switching a selection of points from a respective first cross-section to a respective second cross-section or from a respective second cross-section to a respective first cross-section is done with a click on a second button.

13. The method of claim 1, wherein a respective first cross-section is oriented along a seismic horizon, thus forming a horizontal section of the three-dimensional seismic image block.

14. A non-transitory computer-readable storage medium having stored thereon a computer program comprising instructions to carry out a method for estimating seismic faults based on seismic data gathered from a real subsurface region in a three-dimensional seismic image block representing the subsurface region, the method comprising:
    generating directrices, wherein each directrix is within a respective first cross-section of the seismic image block and generated based on points graphically selected by a user on the respective first cross-section;
    generating generatrices, wherein each generatrix is within a respective second cross-section of the seismic image block and generated based on points graphically selected by the user on the respective second cross-section;
    obtaining relationships from the user, wherein each relationship is between a directrix and a generatrix;
    estimating a fault within the seismic image block as a surface including at least one directrix and at least one generatrix having a relationship therebetween; and
    creating an updated seismic image block identifying the location of the seismic faults.

* * * * *